United States Patent
Ha

(10) Patent No.: US 8,968,134 B2
(45) Date of Patent: Mar. 3, 2015

(54) POWER TRANSMISSION APPARATUS USING A PLANETARY GEAR

(75) Inventor: Tae Hwan Ha, Seoul (KR)

(73) Assignee: Young Su Lee, Seoul (KR)

( * ) Notice: Subject to any disclaimer, the term of this patent is extended or adjusted under 35 U.S.C. 154(b) by 375 days.

(21) Appl. No.: 13/255,228

(22) PCT Filed: Mar. 9, 2010

(86) PCT No.: PCT/KR2010/001472
§ 371 (c)(1),
(2), (4) Date: Sep. 7, 2011

(87) PCT Pub. No.: WO2010/104320
PCT Pub. Date: Sep. 16, 2010

(65) Prior Publication Data
US 2012/0004071 A1    Jan. 5, 2012

(30) Foreign Application Priority Data

Mar. 9, 2009 (KR) .......................... 10-2009-0019718

(51) Int. Cl.
| | |
|---|---|
| *F16H 3/06* | (2006.01) |
| *F16H 3/72* | (2006.01) |
| *B60K 17/16* | (2006.01) |
| *B60K 6/48* | (2007.10) |

(52) U.S. Cl.
CPC .. *F16H 3/72* (2013.01); *B60K 6/48* (2013.01); *Y02T 10/6221* (2013.01); *Y02T 10/7258* (2013.01)
USPC .................... 475/7; 475/218; 475/228; 475/5

(58) Field of Classification Search
CPC ................................... F16H 3/68; F16H 3/72
USPC .............................. 475/7, 218, 207, 228, 230
See application file for complete search history.

(56) References Cited

U.S. PATENT DOCUMENTS

| | | |
|---|---|---|
| 2,898,778 A | 8/1959 | Sansom |
| 3,949,626 A | 4/1976 | Berlinger et al. |

(Continued)

FOREIGN PATENT DOCUMENTS

| | | |
|---|---|---|
| JP | 57-192654 | 11/1982 |
| JP | 58-65449 | 5/1983 |

(Continued)

OTHER PUBLICATIONS

English translation of JP 58-065449, Ube Industries, Ltd, Variable speed power transmission, May 4, 1983, 11 pages.*

(Continued)

*Primary Examiner* — Gene Crawford
*Assistant Examiner* — Lillian Nguyen
(74) *Attorney, Agent, or Firm* — Mannava & Kang, P.C.

(57) ABSTRACT

A power transmission apparatus which includes a planetary gear set with a planetary carrier of which one side extending to form gear teeth, wherein rotating speed input from a driving power source is reduced and then input to one actuating means, rotating speed of a gear-shifting power source is input to another actuating means to achieve a plurality of gear shifts, generating power is obtained from an output shaft to store electricity to a storage battery, the stored electric energy is utilized as controlling energy for gear-shifting power so that a transmission input shaft can be easily controlled.

20 Claims, 19 Drawing Sheets

(56) References Cited

U.S. PATENT DOCUMENTS

| | | | |
|---|---|---|---|
| 4,484,496 A | 11/1984 | Weis | |
| 4,917,200 A * | 4/1990 | Lucius | 180/6.2 |
| 4,973,295 A | 11/1990 | Lee | |
| 5,015,898 A | 5/1991 | Frey | |
| 5,992,259 A * | 11/1999 | Fleytman | 74/425 |
| 6,042,497 A | 3/2000 | Scott | |
| 6,093,126 A | 7/2000 | Fleytman | |
| 6,447,418 B1 | 9/2002 | Fleytman | |
| 6,582,338 B1 | 6/2003 | Fleytman | |
| 6,599,213 B2 * | 7/2003 | Fleytman et al. | 475/5 |
| 6,835,154 B2 * | 12/2004 | Fleytman et al. | 475/210 |
| 7,463,004 B2 | 12/2008 | Burnett | |
| 7,611,433 B2 | 11/2009 | Forsyth | |
| 7,785,221 B2 | 8/2010 | Steinwender | |
| 2007/0197335 A1 | 8/2007 | Raghavan et al. | |
| 2010/0279812 A1 * | 11/2010 | Ha | 475/207 |
| 2012/0004071 A1 | 1/2012 | Ha | |

FOREIGN PATENT DOCUMENTS

| | | |
|---|---|---|
| JP | 02-107857 | 4/1990 |
| JP | 2000-225862 A | 8/2000 |
| JP | 2006-205951 A | 8/2006 |
| KR | 1998-0021268 | 6/1998 |
| KR | 2002-0062068 | 7/2002 |
| KR | 10-0352505 B1 | 9/2002 |
| KR | 10-0397570 B1 | 9/2003 |
| KR | 10-0514010 B1 | 9/2005 |

OTHER PUBLICATIONS

International Search Report for PCT Application No. PCT/KR2010/001472. Korean Intellectual Property Office. Nov. 4, 2010.

JP Office Action for JP counterpart Application No. 2011-553947 dated Dec. 24, 2013.

JP Office Action for JP counterpart Application No. 2011-553947 dated Dec. 24, 2013 and English translation.

* cited by examiner

POWER TRANSMISSION APPARATUS USING A PLANETARY GEAR

PRIORITY

The present application claims priority under 35 U.S.C. §371 to PCT Application PCT/KR2010/001472, filed on Mar. 9, 2010, which claims priority to Korean Patent Application No. 10-2009-0019718, filed on Mar. 9, 2009, the disclosures of which are hereby incorporated by reference in their entireties.

TECHNICAL FIELD

The invention relates generally to a power transmission apparatus using a planetary gear which may be employed in automobiles, vessels, windmills, and converter motors et cetera, more particularly to a power transmission apparatus that includes a planetary gear set with a planet carrier, one side of which is extended to form gear teeth, in which the rotating speed input from a driving power source is reduced and then input to one actuating means of the planetary gear set, the rotating speed of a gear-shifting power source is input to the other actuating means of the planetary gear set to achieve a plurality gear shifts, and power for generating electricity is obtained from an output shaft, the generated electricity is stored, the stored electric energy is utilized as control energy of the gear-shifting power source to control a transmission input shaft with easy.

BACKGROUND

Generally, a transmission is an apparatus that receives the input power from a driving power source, changes it into rotating speed suitable to driving conditions, and transmits it to an output shaft. The type of transmissions include the manual transmission with which a driver achieves his desired gear shift by manipulating a gear shift lever and the automatic transmission in which it automatically achieves an adequate gear shift based on the speed of the car and the opened degree of the throttle valve. The manual transmission has high fuel efficiency but is difficult to manipulate, while the automatic transmission is easy to manipulate but has low fuel efficiency.

Generally speaking, the greater the number of gear shifts that the transmission has, the higher the fuel efficiency of automobile can be obtained. Since the automatic transmission, however, includes a plurality of planetary gear sets and friction elements for manipulating each of the actuating means, the greater the number of gear shifts, the greater the number of the planetary gear sets and the friction elements becomes. This results in weight increase of the automatic transmission, hence lowering the fuel efficiency. So, the number of gear shifts in the automatic transmission is smaller than that of the manual transmission.

Besides, some additional devices used in an automobile et cetera, have to keep working even when not travelling, so they are directly connected to their driving power sources. Since a damper clutch is however disposed between the driving power source and the input shaft, it is not able to connect the additional devices to the input shaft. Therefore space for the additional devices is insufficient.

To solve above mentioned problems, some methods had been proposed to realize a plurality of gear shifts by inputting the rotating speed of a driving power source to one actuating means of a planetary gear set and inputting the rotating speed of a gear-shifting power source to the other another actuating means of the planetary set.

According to the above methods, however, the torque of the driving power source is applied to the gear-shifting power source, which results in serious loss of the torque. In addition, the rotating speed of the driving power source is directly input to the planetary gear set without decelerating of speed, which results in a problem that the gear-shifting is hard if the gear-shifting power source do not provides strong torque.

Technical Problem

The present invention is therefore to solve above problems. An object of the present invention is to provide a power transmission apparatus using a planetary gear in which electric energy of a gear-shifting power source which is required for controlling a transmission input shaft can be obtained from a planet carrier of the planetary gear set.

Another object of the present invention is to provide a power transmission apparatus using a planetary gear, in which the planetary gear and the gear-shifting power source are used to realize a variety of forward and reverse gear shifts.

Yet another object of the present invention is to provide a power transmission apparatus using a planetary gear wherein additional devices may be connected to an input shaft by directly connecting the input shaft to a driving power source.

Yet another object of the present invention is to provide a power transmission apparatus using a planetary gear in which a gear-shifting power source is used that may minimize torque loss of the gear-shifting in the planetary gear set and provide relatively weak torque, allowing a variety of gear shifts.

Yet another object of the present invention is to provide a power transmission apparatus using a planetary gear in which any slipping can be minimized that may arise at coupling portions between actuating means of the planetary gear set and the gear-shifting power source.

Finally yet another object of the present invention is to provide a power transmission apparatus using a planetary gear in which rotation number of an output shaft can be controlled with an accelerator and brake pedals.

Technical Solution

According to an aspect of the invention to achieve the objects, a power transmission apparatus using a planetary gear is provided that includes an input shaft that has one end constantly connected to a driving power source to receive power from the driving power source and has a driving gear fixed mounted thereon, a deceleration unit that is connected to the driving gear and reduces rotating speed of the input shaft, a planetary gear set that includes a first actuating means connected to the deceleration unit and receiving rotating speed of the deceleration unit, a second actuating means receiving power for gear shift, and a third actuating means generating output speed, a gear shift unit that is constantly connected to a gear-shifting power source to receive power for gear shift therefrom and coupled with the second actuating means to transfer the power for gear shift thereto, and an output shaft that is fixed to the third actuating means of the planetary gear set to transmit output speed, wherein a rotation axis of the second actuating means is perpendicular to a rotation axis of the deceleration unit, a torque control shaft is connected to the second actuating means to receive with rotation force of the second actuating means through a power transferring means, a generator for generating electricity is connected to the torque control shaft, and a storage battery for supplying electricity to the gear-shifting power source is connected to the generator.

The planetary gear set is a single pinion planetary gear set including a sun gear, a planet carrier, and a ring gear that are the actuating means of the planetary gear set, wherein the ring gear may work as the first actuating means, the planet carrier may work as the second actuating means, and the sun gear may work as the third actuating means.

The power transmission apparatus using a planetary gear may further include a control unit, wherein the control unit may control operation of the gear-shifting power source corresponding to speed of the output shaft and degree of operation of a brake. The control unit may control rotating speed of the output shaft and perform braking operation by changing rotating speed of the gear-shifting power source. The gear-shifting power source may be a motor.

In the power transmission apparatus using a planetary gear according to a first embodiment of the invention, the deceleration unit may include a deceleration shaft that is disposed parallel to the input shaft, a deceleration gear that is fixed to the deceleration shaft and gear-engaged with the driving gear, a forward and reverse gears that is disposed to be rotatable in reference to the deceleration shaft, and a synchronizer selectively that connects one of the forward gear and the reverse gear to the deceleration shaft to rotate the deceleration shaft and one of the forward gear and the reverse gear in a body, wherein the forward gear is constantly gear-engaged with the first actuating means.

The deceleration unit may further include: an idle shaft that receives the rotating speed of the reverse gear to rotate, a first carrier gear that is fixed to the idle shaft and gear-engaged with the first actuating means, and a second carrier gear that is fixed to the idle shaft and gear-engaged with the forward gear. The synchronizer may operate corresponding to position of an operating lever. An additional device is connected to at least one of the other end of the input shaft and the deceleration unit.

The deceleration unit may include a transmission input shaft that has one end connected to the gear-shifting power source to receive the power for gear shift from the gear-shifting power source, and a worm gear that is formed on the other end of the transmission input shaft and gear-engaged with the second actuating means.

In the power transmission apparatus using a planetary gear according to a second embodiment of the invention, the deceleration unit may include a plurality of shafts disposed parallel with the input shaft and a plurality of gears mounted on the plurality of shafts, wherein two gears having different numbers of gear teeth are mounted on each one of the plurality of shafts in which one of two gears formed on one shaft is gear-engaged with one of two gears mounted on another shaft so that power from the input shaft may be transmitted to the planetary gear set, one of the plurality of gears is gear-engaged with the driving gear, and another of the plurality of gears is gear-engaged with the first actuating means.

A gear having smaller number of gear teeth of two gears formed on each of the plurality of shafts may be gear-engaged with a gear on a shaft which is closest to the driving power source in a power transmitting line, while a gear having larger number of gear teeth of the two gears may be gear-engaged with a gear on a shaft which is closest to the planetary gear set in the power transmitting line.

The gear shift unit may include a plurality of transmission input shafts that are disposed perpendicular to one another and to the output shaft, first gears that are mounted on each of the transmission input shafts to rotate with reference thereto and gear-engaged with the second actuating means, and second gears that is mounted on each of the transmission input shafts to rotate with reference thereto, wherein one second gear mounted one transmission input shaft may be gear-engaged with another second gear mounted another transmission input shaft, and one of the transmission input shafts may be connected to the gear-shifting power source to receive power for gear shift. The first gears may be worm gears and the second gears may be helical gears.

A power transmission apparatus using a planetary gear according to the invention may include a sun gear that has gear teeth formed on an outer circumferential surface thereof and is attached to a rotation shaft to receive power from the rotation shaft or to supply power to the rotation shaft, a ring gear that has gear teeth formed on an inner circumferential surface thereof and encircles the sun gears to rotate reversely to rotation of the sun gear, a plurality of pinion gears that are gear-engaged with the gear teeth on the outer circumferential surface of the sun gear and the gear teeth on the inner circumferential surface of the ring gear, and a planet carrier on which the plurality of pinion gears are rotatably mounted that rotates depending on the rotation of the pinion gears, wherein the planet carrier may have an extended part on one side thereof extending in the direction of the rotation shaft in which the extended part has gear teeth that are obliquely formed on an outer circumferential surface thereof so that a worm gear or a helical gear is meshed thereto, and has second gear teeth further formed on the extended part so that a second helical gear or a second bevel gear is meshed thereto, thereby extracting part of rotation force of the planet carrier. The ring gear may have gear teeth formed on an outer circumferential surface thereof.

A power transmission apparatus using a planetary according to the invention may include an input shaft that has a driving gear formed on one side of an outer circumferential surface thereof, a deceleration unit that includes a deceleration shaft having a deceleration gear gear-engaged with the driving gear, a ring gear that has gear teeth formed on an outer circumferential surface thereof so as to be circumscribed with the deceleration gear, a plurality of pinion gears that is circumscribed with gear teeth formed on an inner circumferential surface of the ring gear, an output shaft that has a sun gear mounted thereon which is circumscribed with the plurality of pinion gears, a planet carrier that is connected to center shafts of the pinion gears to rotate with reference to the output shaft depending to the rotation of the pinion gears, an extended part that extends from the planet carrier in the axis direction of the output shaft, a worm gear and a drive helical gear that are formed on an outer circumferential surface of the extended part, a transmission input shaft that has, on its outer circumferential surface, a worm wheel coupled to the worm gear and is perpendicular to the output shaft so as to be rotated by a gear-shifting power source, a control unit that controls rotating speed of the transmission input shaft, a torque control shaft that has a passive helical gear circumscribed with a driving helical gear of the extended part; and, torque reduction means that is one or more selected from a group consisting of a generator, a deceleration device, and a hydraulic pump that are driven by the torque control shaft.

The deceleration unit may include a first deceleration gear that is formed on the deceleration shaft; and a second deceleration gear that is formed on the deceleration shaft and apart from the first deceleration gear. The first deceleration gear may be connected with the driving gear, and the second deceleration gear may be connected with the gear formed on the outer circumferential surface of the ring gear.

A power transmission apparatus using a planetary gear may include an input shaft that has a driving gear formed on one side of an outer circumferential surface thereof, a deceleration shaft that has a deceleration gear gear-engaged with the driving gear, a driving bevel gear that is formed on one end of the deceleration shaft, a ring gear that has a passive bevel gear formed on one side thereof and is gear-engaged with the drive bevel gear, a plurality of pinion gears that are circumscribed with gear teeth formed on inner circumferential surface of the ring gear, an output shaft that has a sun gear circumscribed with the plurality of pinion gears mounted thereon so that the out shaft rotates together with the sun gear, a planet carrier that is connected to center shafts of the pinion gears to rotate depending on the plurality of pinion gears with reference to the output shaft, an extended part that extends from the planet carrier in an axis direction of the output shaft, a worm and drive bevel gears that are formed on an outer circumferential surface of the extended part, a transmission input shaft that has, on its outer circumferential surface, a worm wheel coupled to the worm gear and is perpendicular to the output shaft so as to be rotated by a gear-shifting power source, a control unit that controls rotating speed of the transmission input shaft corresponding to rotating speed of the output shaft and operation of a brake, a torque control shaft that has a passive helical gear circumscribed with a driving helical gear of the extended part; and, a generator that is connected to the torque control shaft so as to generate electricity, and a storage battery that is electrically connected to the generator and supplies electricity to the gear-shifting power source. Preferably, the passive bevel gear may be formed on one side of the ring gear, and the extended part may be extended from the other side of the ring gear.

A power transmission apparatus using a planetary gear according to the invention may include an input shaft that has a driving gear on one side of an outer circumferential surface thereof, a ring gear that has outer gear teeth engaged with the driving gear, a planet carrier that has, on its circumference, a plurality of pinion gears engaged with inner gear teeth of the ring gear and has a worm wheel and second gear teeth in a form of bevel teeth formed in one end and the other end thereof, respectively, a sun gear that is circumscribed with the plurality of pinion gears, an output shaft that is installed in the sun gear and inserted into the planet carrier, a transmission input shaft that has a worm gear engaged with the worm wheel, a torque control shaft that has bevel teeth and is engaged with the second gear teeth so as to be rotated. In addition, a power transmission apparatus using a planetary gear according to the invention may further include a main motor rotating the input shaft, and a control motor that controls rotation operation of the transmission input shaft. In addition, a power transmission apparatus using a planetary gear according to the invention may include a motor control unit that controls the main motor and the control motor, and an accelerator and brake pedals that are electrically connected to the motor control unit, wherein, when the accelerator is pressed down, the motor control unit increases rotating speed of the output shaft by increasing rotation number of the main motor and at the same time reducing rotation number of the control motor, and when the brake pedal is pressed down, the motor control unit reduces rotating speed of the output shaft by reducing rotation number of the main motor and at the same time increasing rotation number of the control motor.

Advantageous Effects

As mentioned above, according to the power transmission apparatus using a planetary gear of the invention, a variety of forward and reverse gear shifts can be realized by using the planetary gear set and the gear-shifting power source. Especially, in order to realize the reverse gear shift, the first and second carrier gears mounted on the idler shaft are used, it can be realized in the same manner as that of the a forward gear shift.

Since additional devices may be coupled to the input shaft as well as to the deceleration shaft, various rotating speed required for each of the additional devices can be provided.

The braking operation can be performed by using the gear-shifting power source for transmission without a separate braking system, so the construction of the apparatus can be simplified and the production cost can be decreased.

The torque loss of the gear-shifting power source can be decreased since the power for gear-shifting of the gear-shifting power source is input through a worm gear to the planetary gear set.

The gear-shifting can be performed even by using a gear-shifting power source with lower rotating speed since the reduced rotating speed of the driving power source is input the planetary gear set.

Since power of the gear-shifting power source is input through a plurality worm gears to the planetary gear set, any slipping that may arise at connection portions between the planetary gear set and the gear-shifting power source can be minimized.

Since generating of electricity is performed through an electric generator that is driven by partially extracted rotation force from the planet carrier of the planetary gear set to lower the torque of the planetary carrier, it is possible to control rotation control of the output shaft with ease.

In addition, the electric energy which is generated by the generator connected to the planetary carrier is stored into a storage battery, and the stored electric energy is supplied to the gear-shifting power source, thereby enabling self-supplied power for controlling of the gear-shifting input shaft.

In addition, it is possible to control rotation and torque of the output end by using the linked accelerator pedal and brake pedal.

MODE FOR INVENTION

The nature and mode of the operation of the present invention will now be more fully described in the following detailed description of the invention taken with the accompanying drawing Figures.

Figure 1:
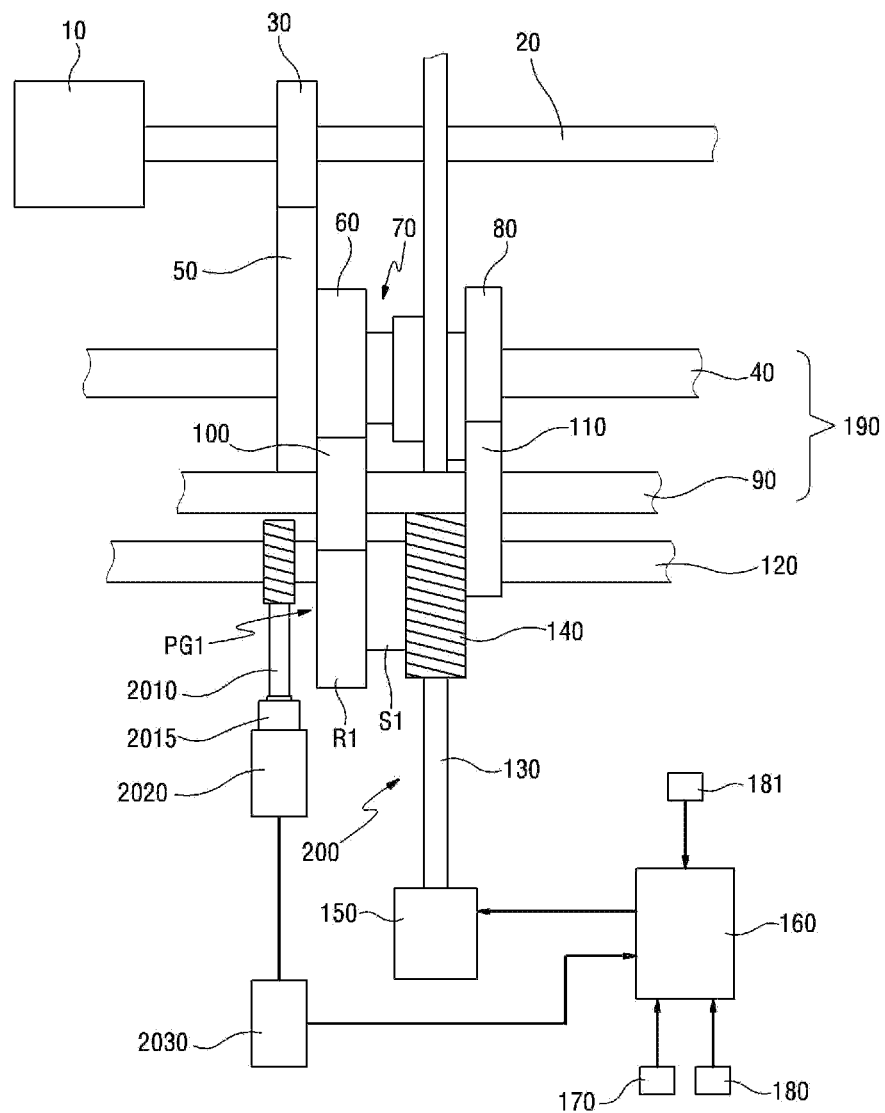
FIG. 1 is a schematically representative view illustrating a construction of a power transmission apparatus according to a first embodiment of the invention.
Figure 2:
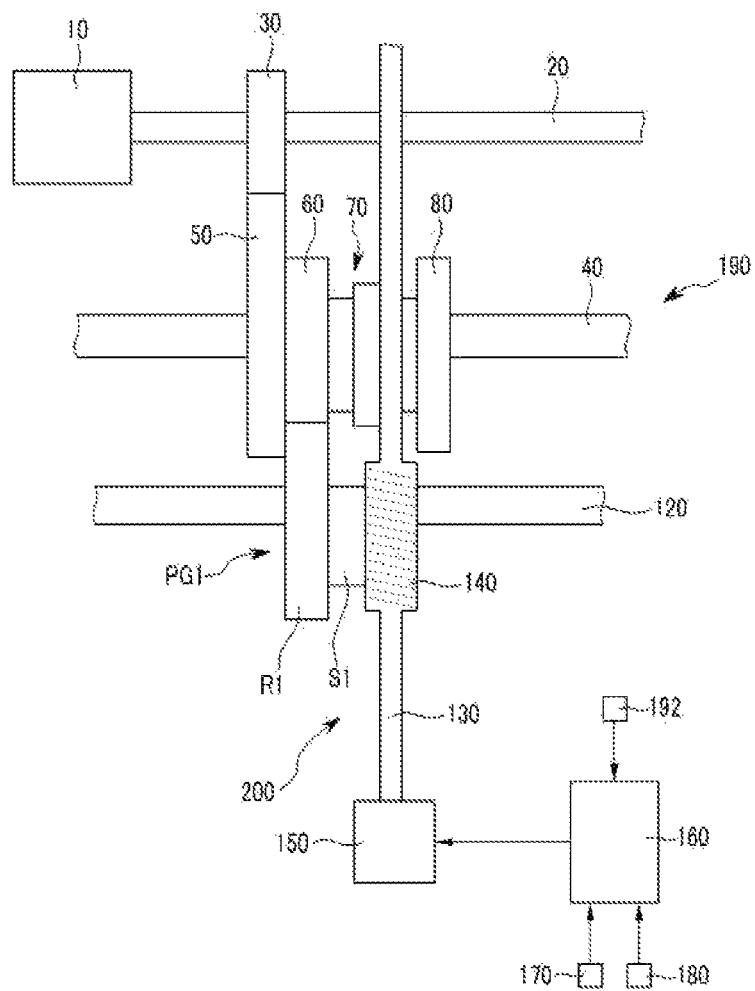
FIG. 2 is a schematically representative view illustrating a construction of the power transmission apparatus of FIG. 1 in which an idle shaft is omitted.
Figure 3:
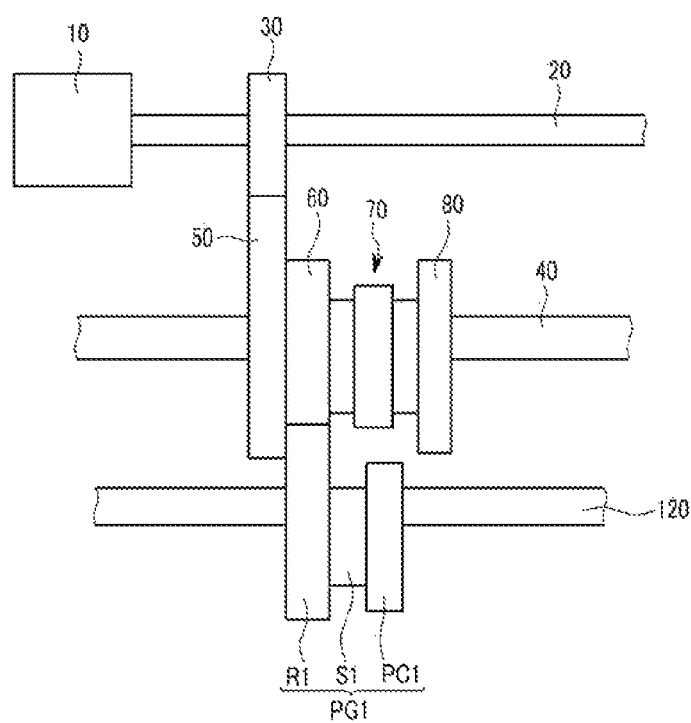
FIG. 3 is a schematically representative view illustrating a construction of the power transmission apparatus of FIG. 2 in which a transmission input shaft is omitted.

FIG. 1 is a schematically representative view illustrating a construction of a power transmission apparatus according to a first embodiment of the invention, FIG. 2 is a schematically representative view illustrating a construction of the power transmission apparatus of FIG. 1 in which an idle shaft is omitted, and FIG. 3 is a schematically representative view illustrating a construction of the power transmission apparatus of FIG. 2 in which a transmission input shaft is omitted.

As shown in FIGS. 1 to 3, a power transmission apparatus according to a first embodiment of the invention includes an input shaft 20, a deceleration unit 190, a planetary gear set PG1, an output shaft 120, a gear shift unit 200, and a control unit 160.

The input shaft 20 has its one end connected directly to a driving power source 10, so that it receives rotating speed of the driving power source 10. A driving gear 30 is fixedly mounted on the input shaft 20 so that the input shaft 20 and the driving gear 30 rotate at the same speed. The driving power source 10 may be a gasoline engine, a diesel engine, a LPG engine, or a hydrogen engine, an electrical and hydraulic/pneumatic motor, a turbine rotated by wind force or tidal power, et cetera.

The deceleration unit 190 includes a deceleration shaft 40, a deceleration gear 50, a forward gear 60, a reverse gear 80, a synchronizer 70, an idle shaft 90, and first and second carrier gears 100 and 110.

The deceleration gear 50, the forward gear 60, the reverse gear 80, and the synchronizer 70 are mounted on the deceleration shaft 40.

The deceleration gear 50 is fixedly mounted on the deceleration shaft 40 and is gear-engaged with the driving gear 30. The number of gear teeth of the deceleration gear 50 is larger than that of the driving gear 30, so the rotating speed of the input shaft 20 can be reduced when being transmitted to the deceleration shaft 40.

The forward gear 60 and the reverse gear 80 are rotatably mounted to rotate relative to the deceleration shaft 40.

The synchronizer 70 may move in a left or right direction in FIGS. 1 to 3 to selectively fix the forward gear 60 or the reverse gear 80 to the deceleration shaft 40. That is, when the synchronizer 70 moves in the left direction in FIGS. 1 to 3, the forward gear 60 get fixed to the deceleration shaft 40 to rotate together with the deceleration shaft 40, while when the synchronizer 70 moves in the right direction in FIGS. 1 to 3, the reverse gear 80 get fixed to the deceleration shaft 40 to rotate together with the deceleration shaft 40. When the synchronizer 70 is positioned at the center between the forward and reverse gears, it is in an idle sate. The synchronizer 70 may be realized by an electronic one or mechanical one. In the case of the mechanical synchronizer 70, its operation may be controlled by a fork (not shown) connected via cable to an operating lever (not shown), while in the case of the electronic synchronizer 70, its operation may be controlled by signals from the control unit 160. Since these synchronizers 70 are widely used and known in the field of manual transmissions, the detailed description thereof is omitted.

The first and second carrier gears 100 and 200 are fixedly mounted on the idle shaft 90. The second carrier gear 110 is gear-engaged with the reverse gear 80.

Figure 7:
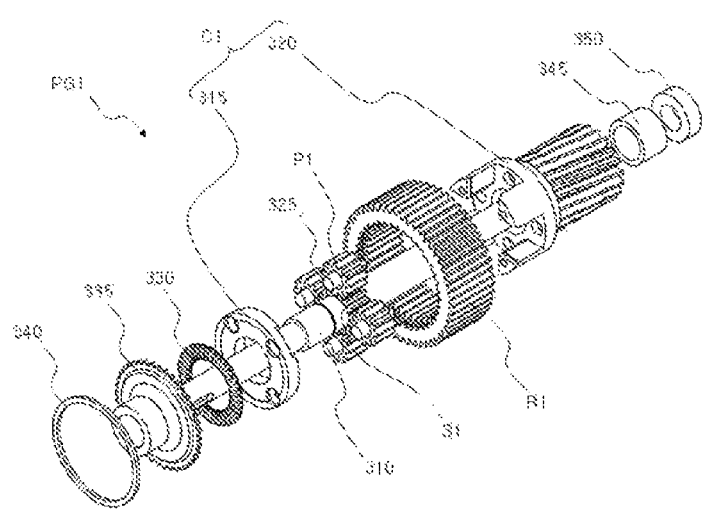
FIG. 7 is an exploded perspective view of a planetary gear set used for embodiments the invention.

The planetary gear set PG1, as shown in FIG. 7, includes a sun gear S1, a planet carrier PC1, and a ring gear R1 as its actuating means. A pinion gear P1 which is gear-engaged with the ring gear R1 and the sun gear S1 is rotatably mounted on the planet carrier PC1 by a pinion shaft 325. The actuating means S1, PC1, and R1 rotate relative to one another.

And, an assembling disk 340 and hubs 345 and 350 for assembling of the planetary gear set PG1 are mounted on opposite sides of the planetary gear set PG1, respectively.

The ring gear R1 has gear teeth on its inner circumferential surface and its outer circumferential surface, in which the gear teeth of the inner circumferential surface are gear-engaged with the pinion gear P1 and a sleeve 335. The ring gear R1 works as the first actuating means. The forward gear 60 is gear-engaged and the first carrier gear 100 is also gear-engaged with the outer circumferential surface of the ring gear R1. Hence, when the synchronizer 70 moves to fix the forward gear 60 to the deceleration shaft 40, power of the driving power source 10 is input to the ring gear R1 via the forward gear 60, while when the synchronizer 70 moves to fix the reverse gear 80 to the deceleration shaft 40, power of the driving power source 10 is input to the ring gear R1 through in turn the reverse gear 80, the second carrier gear 110, and the first carrier gear 100.

The planet carrier PC1 includes a carrier cup 320 and a carrier cover 315 which are fixed to each other. The pinion gear P1 is rotatably mounted between the carrier cup 320 and the carrier cover 315, so that the planet carrier may rotate depending on the rotation of the pinion gear P1. And, a bearing 330 is mounted between the carrier cover 315 and the sleeve 335 so as to decrease friction to arise when rotating. The carrier cup 320 has an extended part that extends in the direction of a rotation shaft 310 opposite to the carrier cover 315 and has gear teeth on its outer circumferential surface. The gear teeth of the outer circumferential surface of the extended part are inclined relative to its rotation axis so as to be engaged with a worm gear or a helical gear, whereby preventing reversion. Therefore, the planet carrier PC1 works as a second actuating means and receives power for gear shift from the transmission input shaft 130. The power for gear shift is supplied to a worm wheel 302 mounted on the outer circumferential surface of the extended part by a worm gear or a helical gear.

The sun gear S1, which works as a third actuating means, has gear teeth on its outer circumferential surface and is fixedly mounted to an output shaft 120 (here, the rotation shaft 310). So, the sun gear S1 may receive power from the rotation shaft 310 or may supply power to the rotation shaft 310.

The planetary gear set PG1 as such may change the rotating speed of the output shaft using the rotating speed of the deceleration shaft 40 and the rotating speed of the transmission input shaft 130.

The output shaft 120 is connected with a differential unit (not shown) so as to rotate wheels (not shown).

The gear shift unit 200 includes a transmission input shaft 130 and a worm gear 140.

The transmission input shaft 130 has one end connected to a gear-shifting power source 150 to receive the power for gear shift, and has a worm gear 140 fixedly mounted on its middle portion. Since the worm gear 140 is gear-engaged with the planet carrier to transfer power, the loss of torque of the driving power source 10 can be decreased by the transmission input shaft 130. In addition, since the rotating speed of the driving power source 10 is reduced by the deceleration gear 50 and then input to the planetary gear set PG1, it is not necessary to excessively increase the rotating speed of the transmission input shaft 130 in order to obtain a target value of the rotating speed of the output shaft 120. The gear teeth of the planet carrier PC1 may be made in the form of helical, and a helical gear can be used instead of the worm gear 140.

And, a pair of transmission input shafts 130 may be mounted under and above the planet carrier PC1, and the pair of transmission input shafts 130 may be connected by power transferring means such as belts or chains.

The gear-shifting power source 150 may be one of various means for generating rotating speed such as a DC motor, a hydraulic motor etc. It is preferred that the gear-shifting power source 150 is a generating means of which rotating speed can be easily controlled by controlling the control unit 160.

The control unit 160 controls the operation of the gear-shifting power source 150 to achieve a target gear shift. The control unit 160 includes a brake position sensor 170, an output shaft speed sensor 180, and an operating lever position sensor 181. The control unit 160 may be embodied as one or more processors which operate with predetermined programs.

The brake position sensor 170 senses the degree of operation of a brake pedal, the output shaft speed sensor 180 senses the rotating speed of the output shaft 120, and the operating lever position sensor 181 senses the position of the operating lever (not shown).

Therefore, the control unit 160 may calculate a target gear shift or a target braking force based on the position of the brake, speed of the output shaft 120, and the position of the operating lever and control the rotating speed of the gear-shifting power source 150 accordingly.

Figure 4:
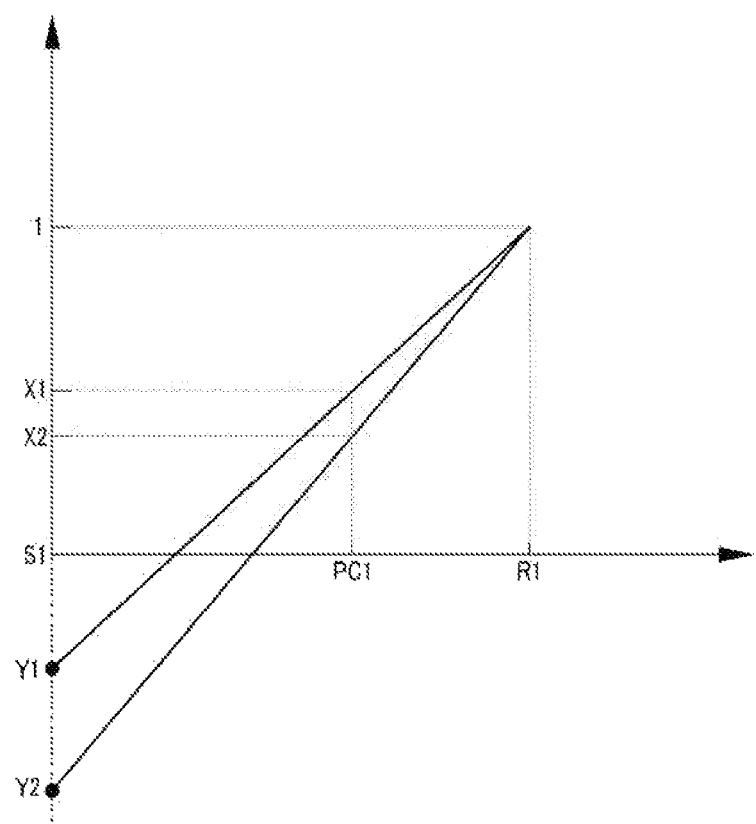
FIG. 4 is a graph representing a speed diagram for a forward gear shift of the power transmission apparatus according to the first embodiment of the invention.

FIG. 4 is a graph representing a speed diagram for a forward gear shift of the power transmission apparatus according to the first embodiment of the invention. In FIG. 4, the rotating speed of sun gear S1 has positive values below the horizontal axis and negative values above the horizontal axis.

In the case of a forward gear shift in which the synchronizer 70 makes the forward gear 60 fixedly coupled to the deceleration shaft 40, if rotating speed input to the ring gear R1 is considered as 1 when rotating speed of the input shaft 20 is reduced by the deceleration gear 50 and input to the ring gear R1, and the rotating speed input to the planet carrier PC1 from the gear-shifting power source 150 is considered as first rotating speed X1, then the rotating speed transferred to the output shaft 120 via the sun gear S1 is first output speed Y1. Here, if the control unit 150 determines that rotation speed of second output speed Y2 should be output, it controls in such a manner that rotating speed to be input to the planet carrier PC1 from the gear-shifting power source 150 becomes the second output speed Y2. In this way, the target gear shift can be achieved by changing the rotating speed input to the planet carrier PC1 from the gear-shifting power source 150.

The reverse gear shifts can be realized by increasing the rotating speed of the gear-shifting power source 150, but in this case the gear-shifting power source 150 may rotate at excessive rotating speed. Hence, the power transmission apparatus according to the invention embodies the reverse gear shifts by using an idle shaft 90 and first and second carrier gears 100 and 110. That is, when the synchronizer 70 makes the reverse gear 80 fixedly coupled to the deceleration shaft 40, rotating speed of the deceleration shaft 40 is transferred indirectly to the ring gear R1 via the idle shaft 90, rather than directly to the ring gear R1. In course of this, the rotating speed transferred to the ring gear R1 has reversed direction. Hence, the reverse gear shift can be realized by using the same manner as that of the forward gear shift.

Another manner for realizing the reverse gear shifts is to increase the rotating speed input to the planet carrier PC1.

And, the power transmission apparatus according to the invention may perform the braking operation by not only using a brake installed on the wheels but also controlling the rotating speed of the gear-shifting power source 150.

For example, when braking is necessary while the car is travelling with a forward gear shift, reverse rotation force can be applied to the output shaft 60 by increasing the rotating speed of the gear-shifting power source 150. Hence, the response property of braking can be shortened.

Figure 5:
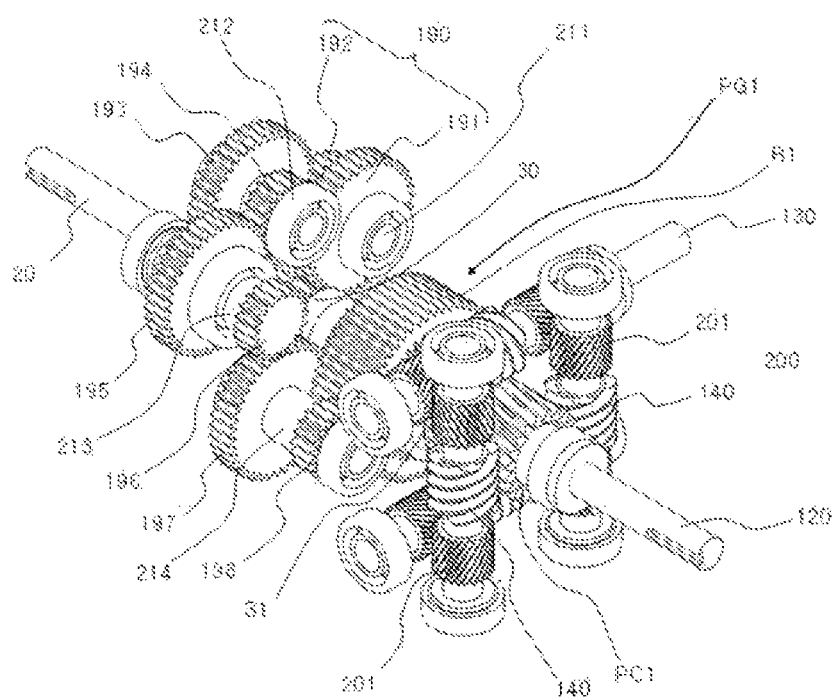
FIG. 5 is a perspective view illustrating a construction of a power transmission apparatus according to a second embodiment of the invention.
Figure 6:
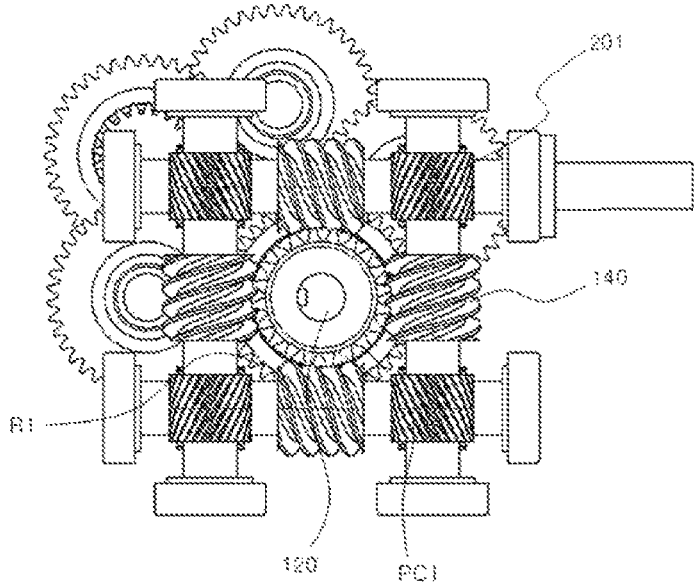
FIG. 6 is a rear view of the construction of the power transmission apparatus according to the second embodiment of the invention.

Referring to FIGS. 5 and 6, a power transmission apparatus according to a second embodiment of the invention will be described below in detail.

FIG. 5 is a perspective view illustrating a construction of a power transmission apparatus according to a second embodiment of the invention, and FIG. 6 is a rear view of the construction of the power transmission apparatus according to the second embodiment of the invention.

The power transmission apparatus according to the second embodiment of the invention is similar to that of the first embodiment of the invention. Therefore, the same numerals will be applied to the same parts and the detailed description of them will be omitted.

As shown in FIGS. 5 and 6, the power transmission apparatus according to the second embodiment of the invention includes an input shaft 20, a deceleration unit 190, a planetary gear set PG1, an output shaft 120, a gear shift unit 200, and a control unit 160 (refer to FIGS. 1 and 2).

Detailed description for the input shaft 20, the planetary gear set PG1, the output shaft 120, and the control unit 160 is omitted.

In the power transmission apparatus according to the second embodiment of the invention, the deceleration unit 190 includes four shafts 211, 212, 213, and 214 which are disposed parallel to the input shaft 20, and eight gears 191, 192, 193, 194, 195, 196, 197, and 198, every two of which are respectively mounted on each of the shafts 211, 212, 213, and 214.

On the first shaft 211, the first and second gear 191 and 192 having different numbers of gear teeth are mounted, and the first gear 191 is gear-engaged with the driving gear 30 of the input shaft 20. The number of gear teeth of the first shaft 191 is smaller than that of the second gear 192.

On the second shaft 212, the third and fourth gear 193 and 194 having different numbers of gear teeth are mounted, and the third gear 193 is gear-engaged with the second gear 192 of the first shaft 211. The number of gear teeth of the third shaft 193 is smaller than that of the fourth gear 194.

On the third shaft 213, the fifth and sixth gear 195 and 196 having different numbers of gear teeth are mounted, and the fifth gear 195 is gear-engaged with the fourth gear 194 of the second shaft 212. The number of gear teeth of the fifth shaft 195 is smaller than that of the sixth gear 196.

On the fourth shaft 214, the seventh and eighth gear 197 and 198 having different numbers of gear teeth are mounted, the seventh gear 197 is gear-engaged with the sixth gear 196 of the third shaft 213, and the eighth gear 198 is gear-engaged with the ring gear R1 of the planetary gear set PG1. The number of gear teeth of the seventh shaft 197 is smaller than that of the eighth gear 198.

Of the two gears formed on each one shaft, the gear having smaller number of gear teeth is gear-engaged with a shaft that is close to the driving power source on the power transferring line, the gear having larger number of gear teeth is gear-engaged with a shaft that is close to the planetary gear set on the power transferring line. For example, on the second shaft 212, the third gear 193 having smaller number of gear teeth is gear-engaged with the second gear 192 of the first shaft 211 that is close to the driving power source 10 on the power transferring line. Hence the rotating speed of the input shaft 20 decreases gradually as passing shafts one-by-one, and then final decreased rotating speed is transferred to the first actuating means R1 of the planetary gear set PG1.

Although, in the second embodiment of the invention, it has been exemplified that the reduction of rotating speed can be performed using four shafts and eight gears, the invention is not limited thereto. It is possible that at least one shaft and at least two gears can be used for the reduction.

The gear shift unit 200 includes transmission input shafts 130, first gears 140, and second gears 201. In this embodiment, an example using four transmission input shafts 130, four first gears 140, and eight second gears 201, which is not to limit the scope of the invention.

A plurality of transmission input shafts 130 are arranged perpendicular to one another and to the output shaft 120.

The first gears 140 are respectively mounted on each of transmission input shafts 130 to rotate on the transmission input shafts 130 and gear-engaged with a second actuating means PC1 of the planetary gear set PG1. Since the transmission input shafts 130 are perpendicular to the output shaft 120, the rotation axis of the first gears 140 is perpendicular to that of the second actuating means PC1. Hence worm gears or helical gears can be used as the first gears 140.

The second gears 201 are respectively mounted on each of transmission input shafts 130 to rotate on the transmission input shafts 130. One second gear 201 mounted on one transmission input shaft 130 is gear-engaged with another second gear 201 mounted on another transmission input shaft 130 so that the power for gear shift is transferred. And, since the transmission input shafts 130 are perpendicular to one another, the rotation axis of the second gears 140 are also perpendicular to one another. Hence worm gears or helical gears can be used as the second gears 201.

And, since the plurality of first gears 140 are gear-engaged with the second actuating means PC1 to transfer the power for gear shift, any slipping that may arise at connecting positions between the gear-shifting power source 150 and the second actuating means PC1 can be minimized.

Figure 8:
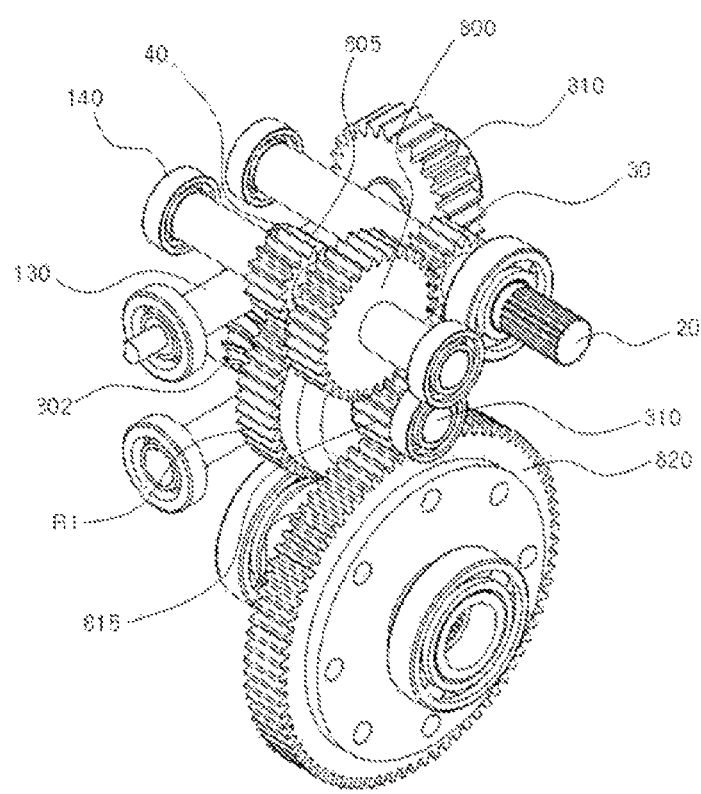
FIG. 8 is a perspective view illustrating a construction of a power transmission apparatus according to a third embodiment of the invention.
Figure 9:
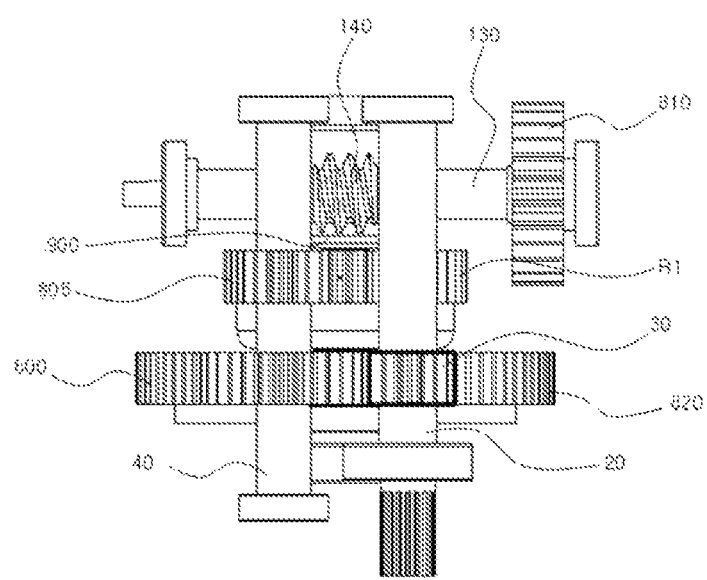
FIG. 9 is a plane view illustrating the power transmission apparatus according to the third embodiment of the invention.

FIG. 8 is a perspective view illustrating a construction of a power transmission apparatus according to a third embodiment of the invention, and FIG. 9 is a plane view illustrating the power transmission apparatus according to the third embodiment of the invention.

Referring to FIGS. 8 and 9, a power transmission apparatus includes an input shaft 20, a driving gear 30, a deceleration shaft 40, a first deceleration gear 800, a second deceleration gear 805, a ring gear R1, a worm wheel 305, an output shaft 310, a first output gear 815, a differential gear 820, a transmission input shaft 130, a worm gear 140, a transmission input shaft gear 810, and a carrier extended part 900.

The input shaft 20 is rotated by a driving power source 10 (FIG. 1) and has the driving gear 30 formed on one side of an outer circumferential surface thereof. The deceleration shaft 40 is disposed apart from and parallel to the input shaft 20 and has the first deceleration gear 800 circumscribed with the driving gear 30 formed on its one side. And, on the deceleration shaft 40, the second deceleration gear 805 is formed apart from the first deceleration gear 800.

The radius of the first deceleration gear 800 is larger than that of the driving gear 30 so as to effectively reduce the rotating speed of and to increase the torque of the input shaft 20. And, the radius of the second deceleration gear 805 is smaller than that of the first deceleration gear 800.

The output shaft 310 is disposed below, apart from, and parallel to the deceleration shaft 40, and a sun gear S1 (FIG. 7) is mounted on the output shaft 310. The ring gear R1, inside of which the sun gear S1 is installed, is mounted on one side of the output shaft 310. The gear teeth formed on the outer circumferential surface of the ring gear R1 is circumscribed with the second deceleration gear 805.

The radius of the second deceleration gear 800 is smaller than those of the first deceleration gear 800 and the ring gear R1 so as to effectively reduce the rotating speed of and to increase torque of the input shaft 20.

The sun gear S1 (FIG. 7) and the planet gear P1 (FIG. 7) are disposed in an inner space of the ring gear R1 to form a planetary gear set.

In addition, the planet carrier C1 (FIG. 7) which couples the rotation shaft of the planet gear P1 has an extended part 900 (FIG. 9) extending in a longitudinal direction of the output shaft 310, in which the extended part 900 has a worm wheel 302 formed on its outer circumferential surface.

The output shaft 310 is perpendicular to the transmission input shaft 130 on which the worm gear 140 is formed in correspondence with the worm wheel 302. The transmission input shaft gear 810 is formed in one end of the transmission input shaft 130.

The transmission input shaft gear 810 rotates the worm gear 140, the worm wheel 302, and the planet carrier C1 (FIG. 7) with power transferred from the gear-shifting power source 150 (FIG. 1).

As mentioned before, the rotating speed of the output shaft 310 connected to the sun gear S1 is controlled corresponding to the rotating speed, stop, forward rotation, and reverse rotation of the transmission input shaft 130, while the rotation of the transmission input shaft 130 is controlled corresponding to the operation of the brake.

The ring gear R1 and the related inner structure of the planetary gear set are shown in FIG. 7, so their detailed description are omitted herein.

Figure 10:
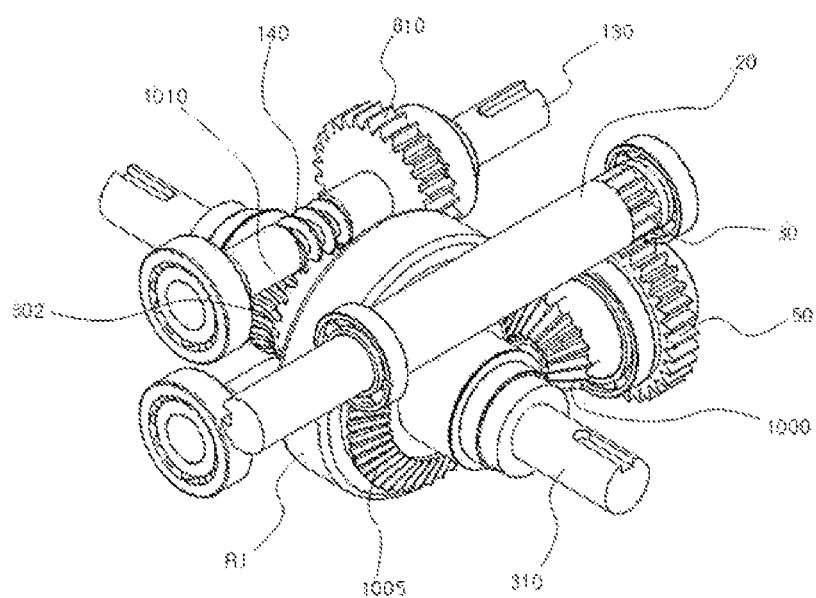
FIG. 10 is a perspective view illustrating a power transmission apparatus according to a forth embodiment of the invention.
Figure 11:
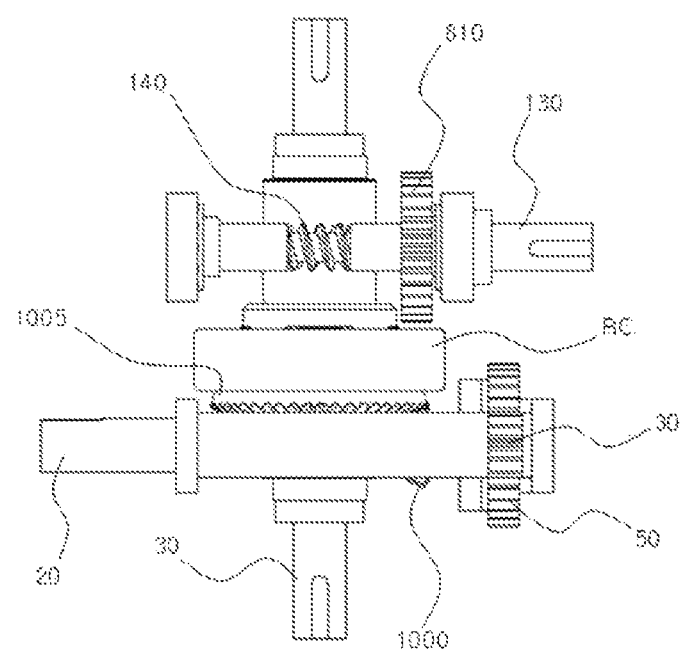
FIG. 11 is a plane view illustrating the power transmission apparatus according to the forth embodiment of the invention.

FIG. 10 is a perspective view illustrating a power transmission apparatus according to a forth embodiment of the invention, and FIG. 11 is a plane view illustrating the power transmission apparatus according to the forth embodiment of the invention.

Referring to FIGS. 10 and 11, a power transmission apparatus includes an input shaft 20, a driving gear 30, a deceleration shaft 40, a drive bevel gear 1000, a passive bevel gear 1005, a ring gear R1, a carrier extended part 1010, a worm wheel 302, a worm gear 140, a transmission input shaft 130, and a transmission input shaft gear 810.

The driving gear 30 is formed on one end of the input shaft 20, and the driving gear 30 is circumscribed with the deceleration gear 50.

The drive bevel gear 1000 is formed on one side of the deceleration gear 50, the passive bevel gear 1005 corresponding to the drive bevel gear 1000 is formed on one side of the ring gear R1.

By the drive bevel gear 1000 and the passive bevel gear 1005, the input shaft 20 can rotate the deceleration gear 50 and the ring gear R1.

The ring gear R1 and the related inner structure of the planetary gear set are shown in FIG. 7, so their detailed description are omitted herein.

The carrier extended part 1010 is, on one side of the planet carrier C1 (FIG. 7), formed to be extended in the longitudinal direction of the output shaft 310. The extended part 1010 has the worm wheel 302 on its outer circumferential surface.

The transmission input shaft 130, which has the worm gear 140 formed thereon, is disposed corresponding to the worm wheel 302. The transmission input shaft 130 has the transmission input shaft gear 140 formed on one side thereof.

In the power transmission apparatus according to the forth embodiment of the invention, the input shaft 20 and the output shaft 310 are disposed perpendicular to one another, and the transmission input shaft 130 and the input shaft 20 are disposed parallel to one another.

It is preferable that a bearing is mounted between the output shaft 310 and the carrier extended part 1010 which is extended from the carrier C1 in one direction of the output shaft 301.

As mentioned above, for effectively transferring of rotation force from the input shaft 20 to the ring gear R1, a structure of bevel gear is employed.

In addition, by controlling the rotation characteristics (speed and direction) of the carrier extended part 1010 with the worm wheel 302 formed on the carrier extended part 1010 and the worm gear 140 formed on the transmission input shaft 130, the rotating speed of the output shaft 310 can be easily controlled.

Figure 12:
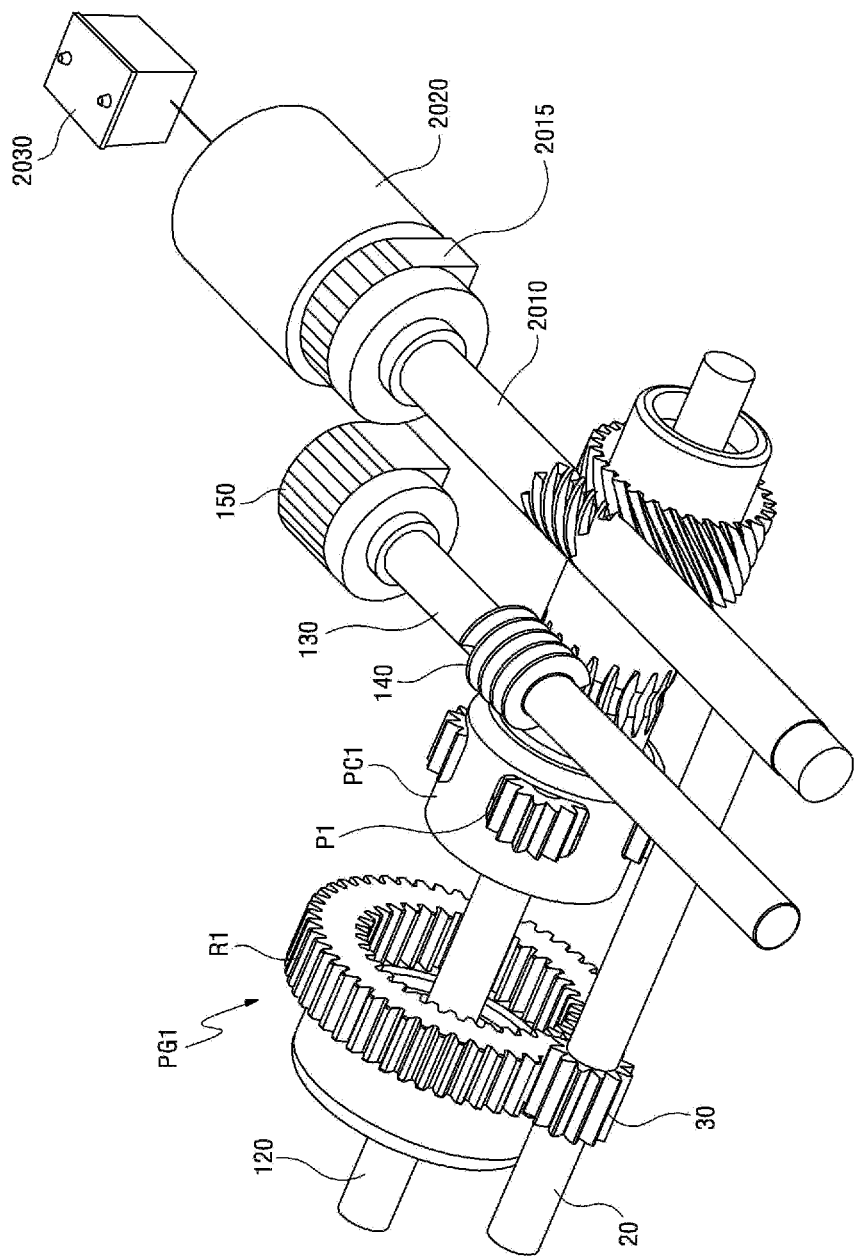
FIG. 12 is a perspective view illustrating a power transmission apparatus according to a fifth embodiment of the invention.
Figure 13:
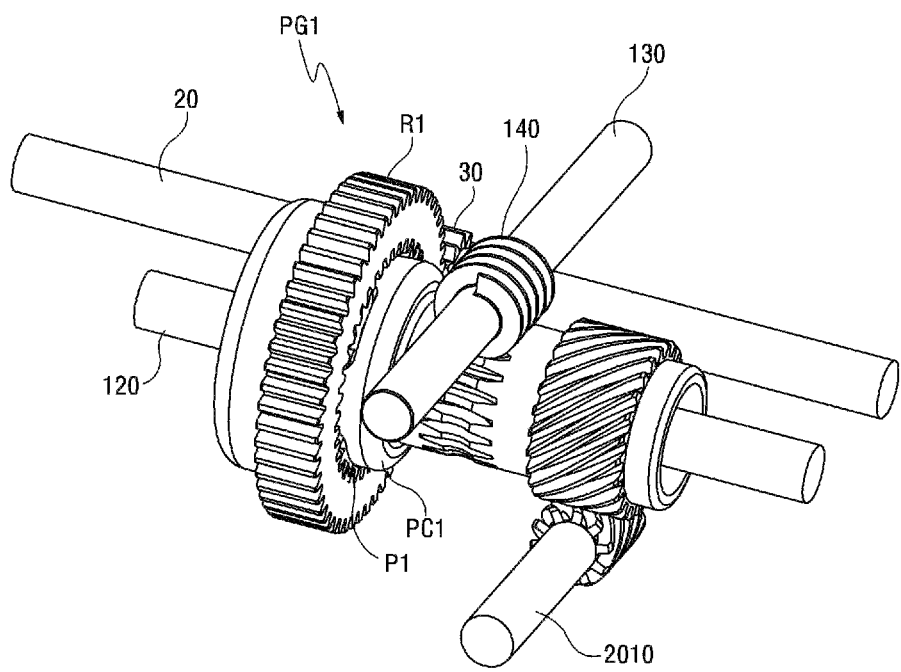
FIG. 13 is a perspective view illustrating a power transmission apparatus according to a sixth embodiment of the invention.
Figure 14:
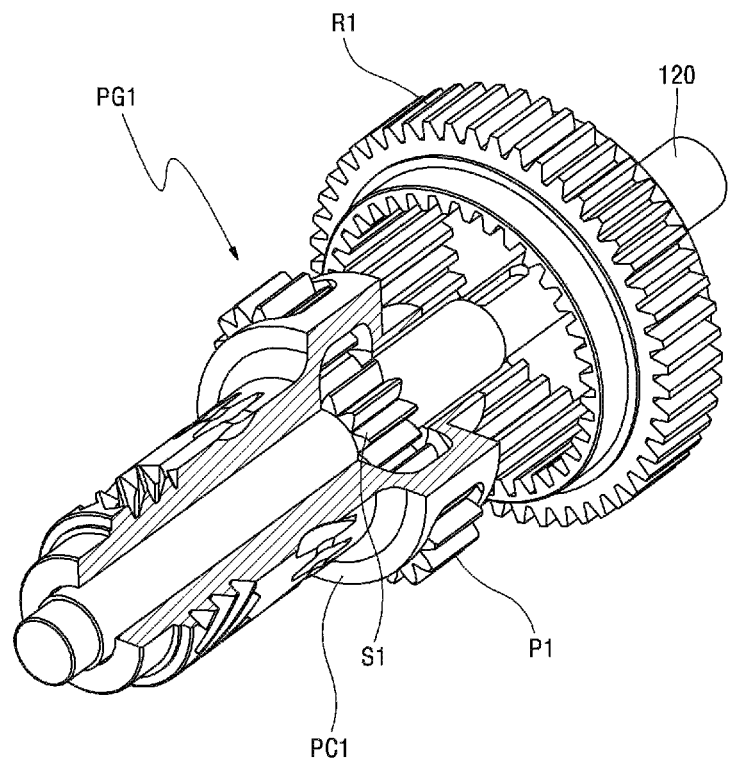
FIG. 14 is a perspective view of the planet carrier employed in the embodiments of FIG. 12 and 13 that shows a partially cross-sectioned portion.
Figure 15:
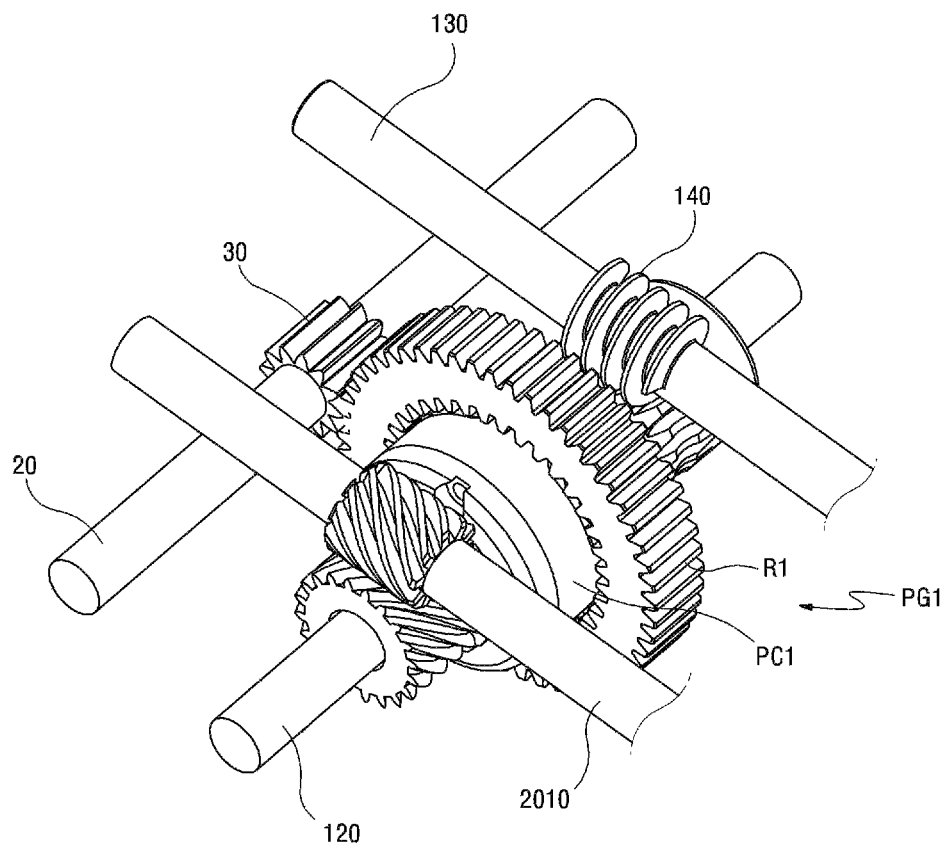
FIG. 15 is a perspective view illustrating a power transmission apparatus according to a seventh embodiment of the invention.

FIG. 12 is a perspective view illustrating a power transmission apparatus according to a fifth embodiment of the invention, FIG. 13 is a perspective view illustrating a power transmission apparatus according to a sixth embodiment of the invention, FIG. 14 is a perspective view showing a partially cross-sectioned portion of the planet carrier employed in the embodiments of FIG. 12 and 13, and FIG. 15 is a perspective view illustrating a power transmission apparatus according to a seventh embodiment of the invention.

As shown in FIG. 1, FIGS. 12 to 15, a torque control shaft 2010 that receives rotation force of a second actuating means via gear-engagements is connected to the second actuating means of the planetary gear set. A generator 2020 for generating electricity is connected to the torque control shaft 2010. And a storage battery 2030 for supplying electric power to the gear-shifting power source 150 is connected to the generator 2020. The generator 2010 may be a device using induced electromotive force that, as is generally known, includes a stator, a rotor, and an exciter. The storage battery 2030 may be, for example, a conventional battery for automobiles.

The planet carrier PC1, that is the second actuating means, has second gear teeth formed on the extended part, in which the second gear teeth is gear-engaged with a second helical gear to extract part of rotation force from the planet carrier PC1. The second gear teeth may be disposed to neighbor with the worm wheel of the planet carrier PC1 as shown in FIGS. 12 and 13, or may be disposed opposite to the worm wheel in reference with the ring gear R1 as shown in embodiment of FIG. 15. The second helical gear is fixed on the torque control shaft 2010.

At this point, the torque control shaft 2010 is disposed parallel to the transmission input shaft 130. Both the worm gear 140 and the second helical gear may be disposed on the same plane which faces upwards or downwards as shown in FIG. 12, or they may be respectively disposed on different two planes so that one faces upwards and the other faces downwards as shown in FIG. 13.

Although not shown in embodiments of FIG. 13 and FIG. 15, the generator 2020 and the storage battery 2030 can be included in the same manner as in the embodiment of FIG. 12. In addition, the input shaft 20 in embodiments of FIGS. 12 to 15 may be replaced with the deceleration shaft 40 or the idle shaft 120.

Hereinafter, the operation of the power transmission apparatus as shown in FIGS. 12 to 15 is described with reference to FIG. 12.

First, as mentioned before, the planet carrier PC1 is rotated to generate rotation torque by the operation of the planetary gear set PG1 which receives rotation force of input shaft 20. Accordingly, the torque control shaft 2010 is rotated by the second helical gear 2100 (this is a driven bevel gear in FIG. 16) that is gear-engaged with the second gear teeth 144 formed on the extended part of the planet carrier PC1.

Hence, the generator 2020 directly connected to the torque control shaft 2010 generates electricity, which the generated electricity is supplied to the storage battery 2030 to be stored.

As such, since the rotation torque of the planet carrier is consumed for driving the torque control shaft 2010, the rotation torque of the planet carrier is decreased.

The gear-shifting power source 150 controlled by the control unit 160 is driven by electric power stored in the storage batter 2030 and controls the transmission input shaft 130.

So the power transmission apparatus has an advantage in that since the gear-shaft power source 150 can work by the electric energy generated from the power of the planet carrier PC1, the electric supply from additional outside source is not required.

Figure 16:
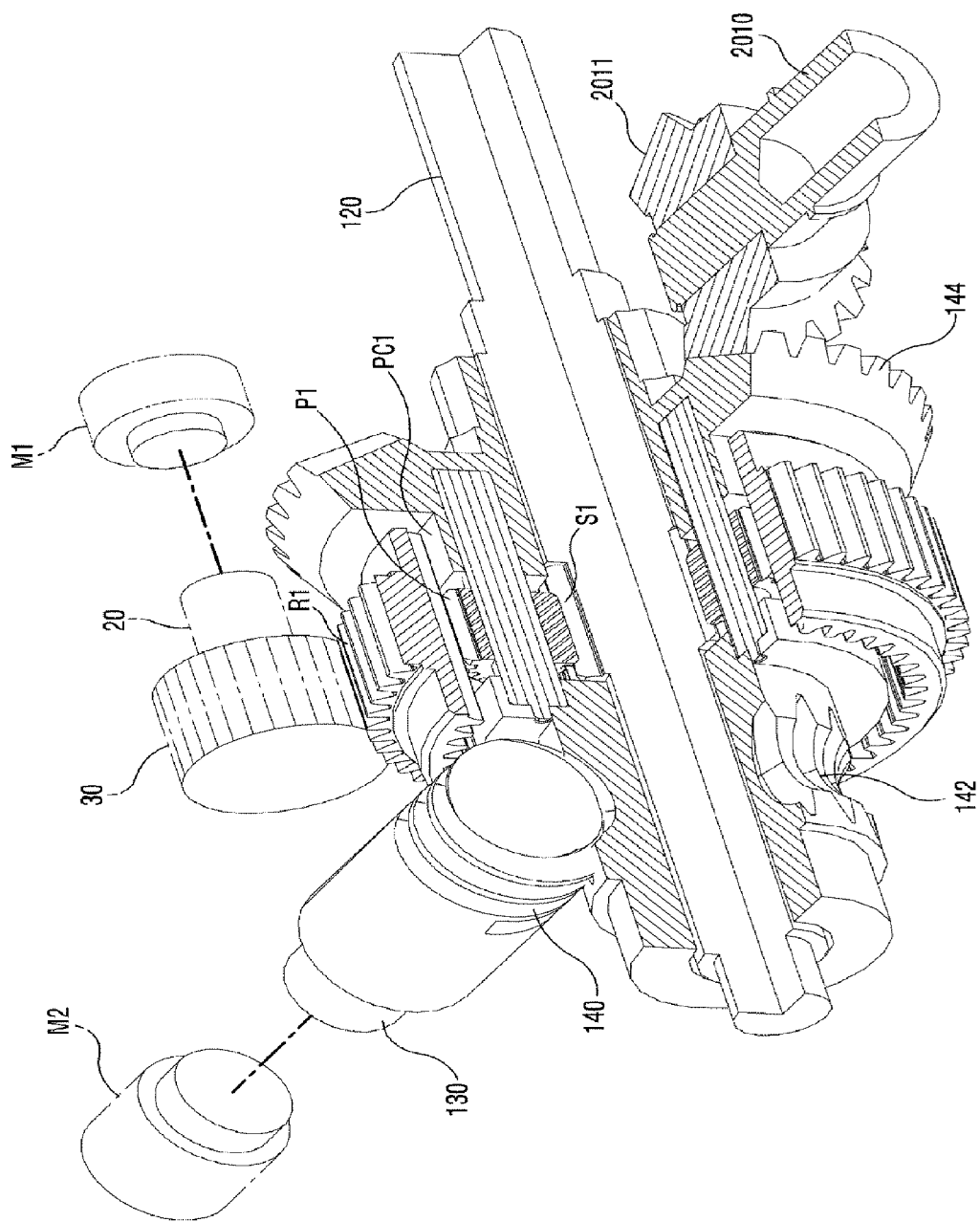
FIG. 16 is a partially cross-sectioned perspective view illustrating a power transmission apparatus according to an eighth embodiment of the invention.

Meanwhile, the second helical gear 2011 may be replaced with a second bevel gear as shown in FIG. 16. In this case, the second gear teeth 144 formed on the extended part of the planet carrier PC1 may be formed in the shape of bevel gear teeth.

In addition, between the torque control shaft 2010 and the generator 2020, a deceleration device that is a gear box 2015 may be further mounted. The gear box 2015 is basically constructed to get reduced rotation output by including a plurality of shafts and gear-engagement of gears on each of the shafts for reducing rotation number. So, the gear box 2015 reduces the rotation torque of the planet carrier PC1 during the reduction process.

Also, either a hydraulic pump (not shown) may be further connected to the torque control shaft 2010 or a hydraulic pump may be directly connected to the planet carrier PC1 so that the rotation torque from the planet carrier PC1 can be decreased. In this case, the hydraulic pressure from the hydraulic pump may be used for the hydraulic source for operating of car's steering system, for example.

Figure 17:
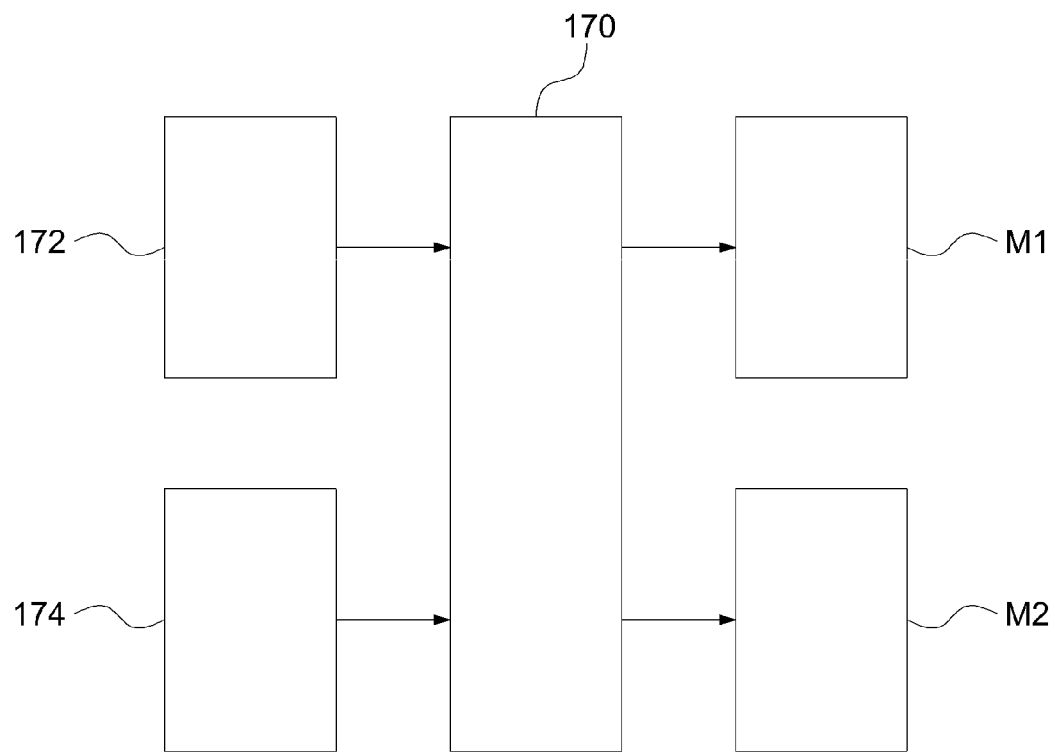
FIG. 17 is a block diagram illustrating a gear-shift of an output end of a power transmission apparatus according to the invention.

In addition, as shown in FIGS. 16 and 17, the power transmission apparatus of the invention may include a main motor M1 for the input shaft 20, a control motor M2 for controlling the rotation operation of the transmission input shaft 130, and a motor control unit 170 for controlling the main motor M1 and the control motor M2. An accelerator pedal 172 and a brake pedal 174 are electrically connected to the motor control unit 170.

Figure 18:
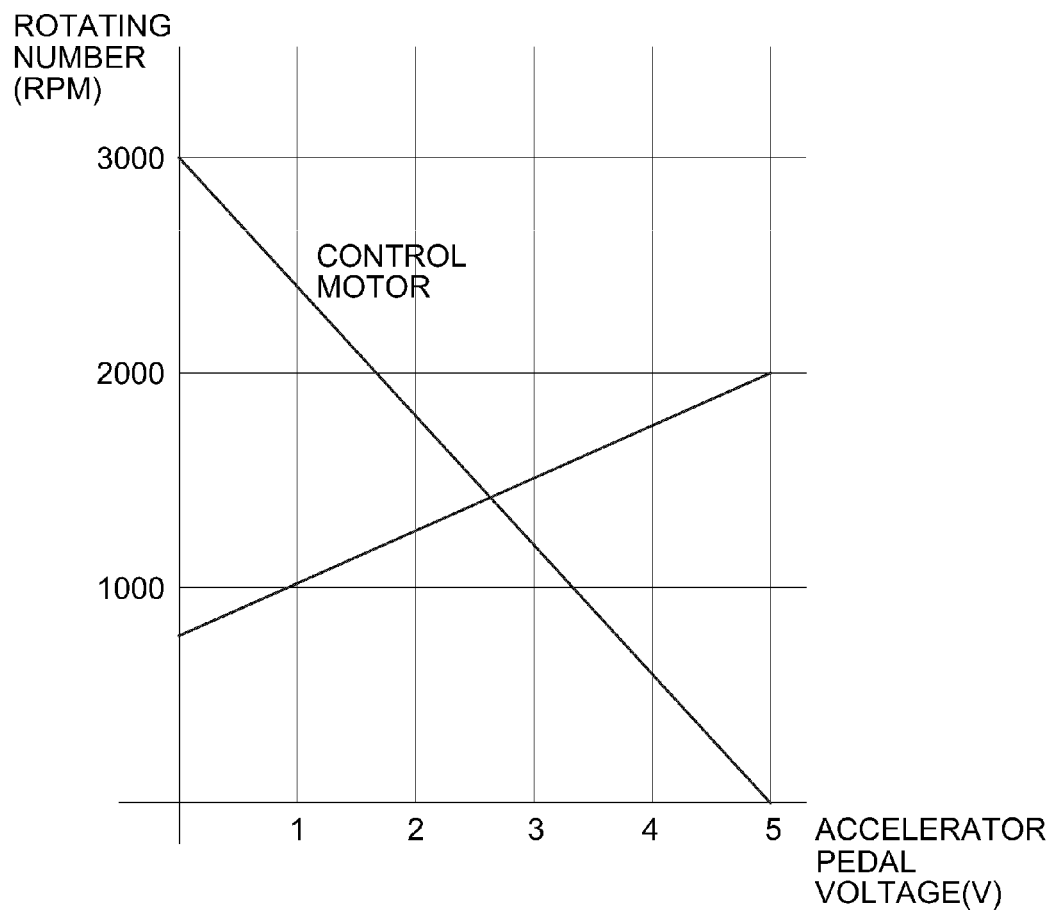
FIG. 18 is a graph illustrating rotating speed of a main motor and control motor corresponding to output voltages of an accelerator pedal when accelerating in a power transmission apparatus of the invention.

When the accelerator pedal 172 is pressed down, the motor control unit 170 increases the rotation number of the main motor M1 and at the same time reduces the rotation number of the control motor M2, whereby increasing the rotating speed of the output shaft 120 as shown in FIG. 18.

Figure 19:
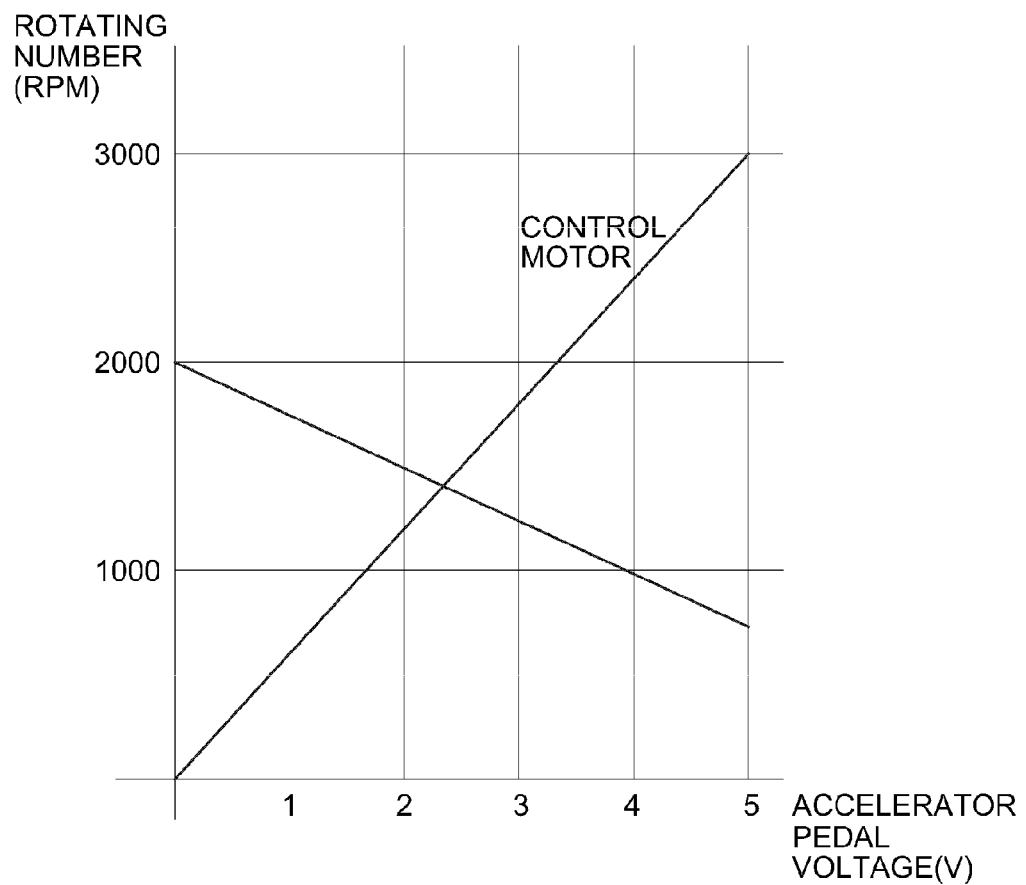
FIG. 19 is a graph illustrating rotating speed of a main motor and control motor corresponding to output voltages of a brake pedal when braking in a power transmission apparatus of the invention.

When the brake pedal 174 is pressed down, the motor control unit 170 reduces the rotation number of the main motor M1 and at the same time increases the rotation number of the control motor M2, whereby reducing the rotating speed of the output shaft 120 as shown in FIG. 19.

The foregoing discussion discloses and describes the preferred embodiments for the present invention. However, one skilled in the art will readily recognize from such discussion, and from the accompanying drawings and claims, that various changes, modifications and variations can be made therein without departing from the true spirit and fair scope of the invention as defined in the following claims.

What is claimed is:

1. A power transmission apparatus comprising:
an input shaft having one end constantly connected to a driving power source and receiving power from the driving power source, the input shaft having a driving gear fixed mounted thereon;
a deceleration unit connected to the driving gear and reducing rotating speed of the input shaft;
a single pinion planetary gear set including a ring gear connected to the deceleration unit and receiving rotating speed of the deceleration unit, a planet carrier receiving power for gear shift, and a sun gear generating output speed; the ring gear works as a first actuating means, the planet carrier works as a second actuating means, and the sun gear works as a third actuating means
a gear shift unit constantly connected to a gear-shifting power source to receive power for gear shift therefrom, the gear shift unit being coupled with the second actuating means to transfer the power for gear shift thereto; and
an output shaft fixed to the third actuating means of the planetary gear set to transmit output speed,
wherein a rotation axis of the second actuating means is perpendicular to a rotation axis of the deceleration unit,
a torque control shaft is connected to the second actuating means to be supplied, through a power transferring means, with rotation force of the second actuating means,
a generator for generating electricity is connected to the torque control shaft, and
a storage battery for supplying electricity to the gear-shifting power source is connected to the generator.

2. The power transmission apparatus according to claim 1, further comprising a control unit, wherein the control controls operation of the gear-shifting power source corresponding to speed of the output shaft and degree of operation of a brake.

3. The power transmission apparatus according to claim 2, wherein the control unit controls rotating speed of the output shaft and performs braking operation by changing rotating speed of the gear-shifting power source.

4. The power transmission apparatus according to claim 3, wherein the gear-shifting power source is a motor.

5. The power transmission apparatus according to claim 1, wherein the deceleration unit comprises:
a deceleration shaft disposed parallel to the input shaft;
a deceleration gear fixed to the deceleration shaft and gear-engaged with the driving gear;
a forward and reverse gears disposed to be rotatable in reference to the deceleration shaft; and
a synchronizer selectively connecting one of the forward gear and the reverse gear to the deceleration shaft to rotate the deceleration shaft and one of the forward gear and the reverse gear in a body,
wherein the forward gear is constantly gear-engaged with the first actuating means.

6. The power transmission apparatus according to claim 5, wherein the deceleration unit further comprises:
an idle shaft receiving the rotating speed of the reverse gear to rotate;
a first carrier gear fixed to the idle shaft and gear-engaged with the first actuating means; and
a second carrier gear fixed to the idle shaft and gear-engaged with the forward gear.

7. The power transmission apparatus according to claim 5, wherein the synchronizer operates corresponding to position of an operating lever.

8. The power transmission apparatus according to claim 1, wherein an additional device is connected to at least one of the other end of the input shaft and the deceleration unit.

9. The power transmission apparatus according to claim 1, wherein the deceleration unit comprises:
a transmission input shaft having one end connected to the gear-shifting power source to receive the power for gear shift from the gear-shifting power source; and
a worm gear formed on the other end of the transmission input shaft and gear-engaged with the second actuating means.

10. The power transmission apparatus according to claim 1, wherein the deceleration unit comprises a plurality of shafts disposed parallel with the input shaft and a plurality of gears mounted on the plurality of shafts,
wherein two gears having different numbers of gear teeth are mounted on each one of the plurality of shafts in which one of two gears formed on one shaft is gear-engaged with one of two gears mounted on another shaft so that power from the input shaft may be transmitted to the planetary gear set, one of the plurality of gears is gear-engaged with the driving gear, and another of the plurality of gears is gear-engaged with the first actuating means.

11. The power transmission apparatus according to claim 10, wherein a gear having smaller number of gear teeth of two gears formed on each of the plurality of shafts is gear-engaged with a gear on a shaft which is closest to the driving power source in a power transmitting line, while a gear having larger number of gear teeth of the two gears is gear-engaged with a gear on a shaft which is closest to the planetary gear set in the power transmitting line.

12. The power transmission apparatus according to claim 1, wherein the gear shift unit comprises:
a plurality of transmission input shafts disposed perpendicular to one another and to the output shaft;
first gears mounted to and rotating on each of the transmission input shafts, the first gears being gear-engaged with the second actuating means; and second gears mounted to and rotating on each of the transmission input shafts,
wherein one of the second gears mounted on one of the transmission input shafts is gear-engaged with another second gear mounted another transmission input shaft, and one of the transmission input shafts is connected to the gear-shifting power source to receive power for gear shift.

13. The power transmission apparatus according to claim 12, wherein the first gears are worm gears and the second gears are helical gears.

14. A power transmission apparatus comprising:
an input shaft having one end constantly connected to a driving power source and receiving power from the driving power source, the input shaft having a driving gear fixed mounted thereon;
a deceleration unit connected to the driving gear and reducing rotating speed of the input shaft, wherein the deceleration unit comprises:
    a deceleration shaft disposed parallel to the input shaft;
    a deceleration gear fixed to the deceleration shaft and gear-engaged with the driving gear;
    a forward and reverse gears disposed to be rotatable in reference to the deceleration shaft; and
    a synchronizer selectively connecting one of the forward gear and the reverse gear to the deceleration shaft to rotate the deceleration shaft and one of the forward gear and the reverse gear in a body, wherein the forward gear is constantly gear-engaged with a first actuating means; a planetary gear set including the first actuating means
connected to the deceleration unit and receiving rotating speed of the deceleration unit, a second actuating means receiving power for gear shift, and a third actuating means generating output speed;
a gear shift unit constantly connected to a gear-shifting power source to receive power for gear shift therefrom, the gear shift unit being coupled with the second actuating means to transfer the power for gear shift thereto; and
an output shaft fixed to the third actuating means of the planetary gear set to transmit output speed,
wherein a rotation axis of the second actuating means is perpendicular to a rotation axis of the deceleration unit,
a torque control shaft is connected to the second actuating means to be supplied, through a power transferring means, with rotation force of the second actuating means,
a generator for generating electricity is connected to the torque control shaft, and
a storage battery for supplying electricity to the gear-shifting power source is connected to the generator.

15. The power transmission apparatus according to claim 14, wherein the planetary gear set is a single pinion planetary gear set including a sun gear, a planet carrier, and a ring gear that are the actuating means of the planetary gear set, wherein the ring gear works as the first actuating means, the planet carrier works as the second actuating means, and the sun gear works as the third actuating means.

16. The power transmission apparatus according to claim 14, wherein the deceleration unit comprises:
a transmission input shaft having one end connected to the gear-shifting power source to receive the power for gear shift from the gear-shifting power source; and
a worm gear formed on the other end of the transmission input shaft and gear-engaged with the second actuating means.

17. A power transmission apparatus comprising:
an input shaft having one end constantly connected to a driving power source and receiving power from the driving power source, the input shaft having a driving gear fixed mounted thereon;
a deceleration unit connected to the driving gear and reducing rotating speed of the input shaft, wherein the deceleration unit comprises:
    a transmission input shaft having one end connected to the gear-shifting power source to receive the power for gear shift from the gear-shifting power source; and
    a worm gear formed on the other end of the transmission input shaft and gear-engaged with a second actuating means; a planetary gear set including a first actuating means connected to the deceleration unit and receiving rotating speed of the deceleration unit, the second actuating means receiving power for gear shift, and a third actuating means generating output speed;
a gear shift unit constantly connected to a gear-shifting power source to receive power for gear shift therefrom, the gear shift unit being coupled with the second actuating means to transfer the power for gear shift thereto; and
an output shaft fixed to the third actuating means of the planetary gear set to transmit output speed,
wherein a rotation axis of the second actuating means is perpendicular to a rotation axis of the deceleration unit,
a torque control shaft is connected to the second actuating means to be supplied, through a power transferring means, with rotation force of the second actuating means,
a generator for generating electricity is connected to the torque control shaft, and
a storage battery for supplying electricity to the gear-shifting power source is connected to the generator.

18. The power transmission apparatus according to claim 17, wherein the planetary gear set is a single pinion planetary gear set including a sun gear, a planet carrier, and a ring gear that are the actuating means of the planetary gear set, wherein the ring gear works as the first actuating means, the planet carrier works as the second actuating means, and the sun gear works as the third actuating means.

19. The power transmission apparatus according to claim 17, wherein the deceleration unit comprises:
a deceleration shaft disposed parallel to the input shaft;
a deceleration gear fixed to the deceleration shaft and gear-engaged with the driving gear;
a forward and reverse gears disposed to be rotatable in reference to the deceleration shaft; and
a synchronizer selectively connecting one of the forward gear and the reverse gear to the deceleration shaft to rotate the deceleration shaft and one of the forward gear and the reverse gear in a body, wherein the forward gear is constantly gear-engaged with the first actuating means.

20. The power transmission apparatus according to claim 17, wherein the deceleration unit comprises a plurality of shafts disposed parallel with the input shaft and a plurality of gears mounted on the plurality of shafts,
wherein two gears having different numbers of gear teeth are mounted on each one of the plurality of shafts in which one of two gears formed on one shaft is gear-engaged with one of two gears mounted on another shaft so that power from the input shaft may be transmitted to the planetary gear set, one of the plurality of gears is gear-engaged with the driving gear, and another of the plurality of gears is gear-engaged with the first actuating means.

\* \* \* \* \*